United States Patent [19]
Petrovic et al.

[11] Patent Number: 5,940,135
[45] Date of Patent: Aug. 17, 1999

[54] APPARATUS AND METHOD FOR ENCODING AND DECODING INFORMATION IN ANALOG SIGNALS

[75] Inventors: Rade Petrovic, Wilmington; Joseph M. Winograd, Cambridge; Kanaan Jemili, Woburn; Eric Metois, Somerville, all of Mass.

[73] Assignee: Aris Technologies, Inc., Cambridge, Mass.

[21] Appl. No.: 08/858,562

[22] Filed: May 19, 1997

[51] Int. Cl.⁶ .................................................. H04N 7/087
[52] U.S. Cl. ...................... 348/473; 348/469; 348/907; 348/1; 380/6; 455/2; 341/139; 375/209
[58] Field of Search ...................................... 348/473, 614, 348/1, 469, 907; 375/209; 380/6; 455/2; 341/139; H04N 7/087

[56] References Cited

U.S. PATENT DOCUMENTS

| | | | |
|---|---|---|---|
| 4,564,862 | 1/1986 | Cohen | 358/167 |
| 5,319,453 | 6/1994 | Copriviza et al. | 348/473 |
| 5,379,345 | 1/1995 | Greenberg | 380/6 |
| 5,414,729 | 5/1995 | Fenton | 375/209 |
| 5,526,427 | 6/1996 | Thomas et al. | 455/2 |
| 5,737,329 | 4/1998 | Horiguchi | 375/209 |
| 5,764,763 | 6/1998 | Jensen et al. | 380/6 |
| 5,787,334 | 7/1998 | Fardeau et al. | 455/2 |
| 5,805,635 | 9/1998 | Andrews, Jr. et al. | 375/209 |
| 5,809,064 | 9/1998 | Fenton et al. | 375/209 |
| 5,850,249 | 12/1998 | Massetti et al. | 348/1 |

*Primary Examiner*—John K. Peng
*Assistant Examiner*—Jean W. Desir
*Attorney, Agent, or Firm*—Rothwell, Figg, Ernst & Kurz

[57] ABSTRACT

Apparatus and methods are provided for encoding, storing and decoding auxiliary information on an analog source signal in a way which has minimal impact on the human perception of the source information when the source signal is applied to an appropriate output device, such as a speaker or a display monitor. The autocorrelation function of a host signal is modulated according to the value of an auxiliary information signal by adding a host modifying signal to the host signal. The auxiliary signal is decoded by generating the autocorrelation function of the encoded signal and extracting the auxiliary signal according to well-known signal extraction techniques.

27 Claims, 5 Drawing Sheets

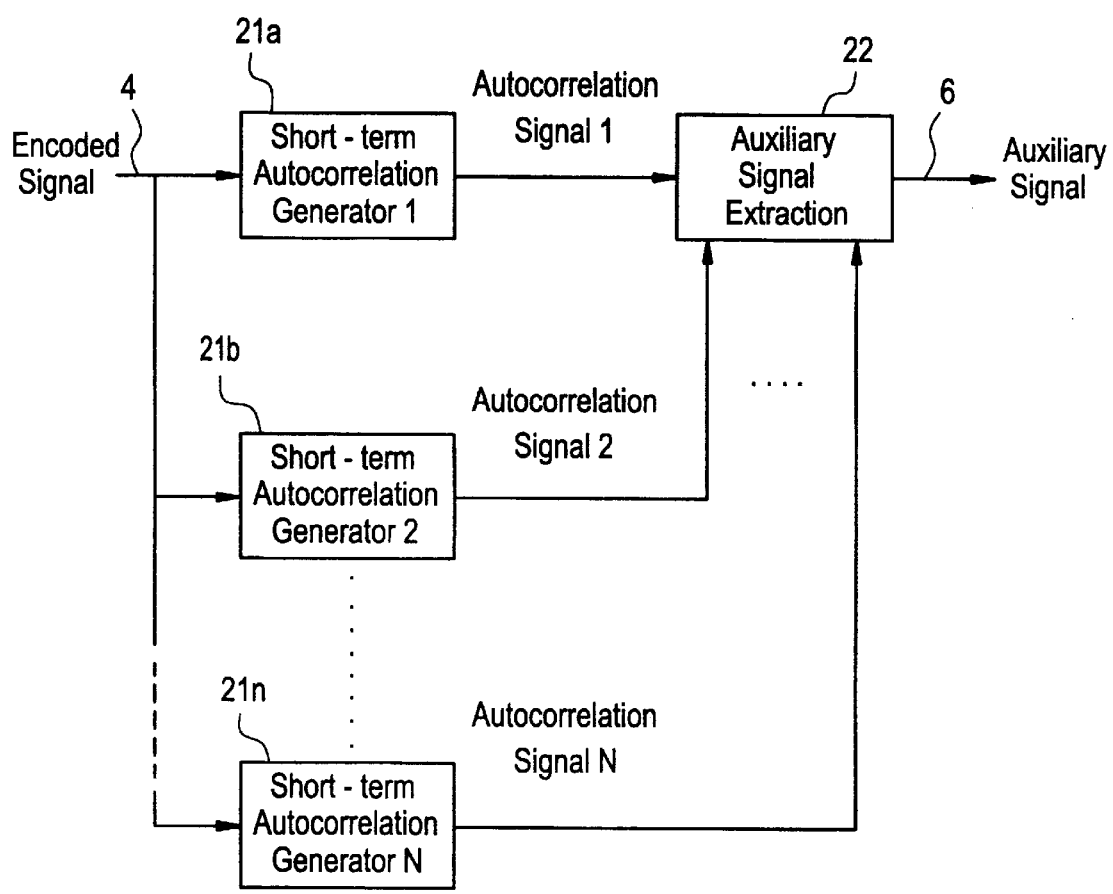

APPARATUS AND METHOD FOR ENCODING AND DECODING INFORMATION IN ANALOG SIGNALS

BACKGROUND OF THE INVENTION

1. Field of the Invention

This invention relates to apparatus and methods for encoding and decoding information in analog signals, such as audio, video and data signals, either transmitted by radio wave transmission or wired transmission, or stored in a recording medium such as optical or magnetic disks, magnetic tape, or solid state memory.

2. Background and Description of Related Art

An area of particular interest to certain embodiments of the present invention relates to the market for musical recordings. Currently, a large number of people listen to musical recordings on radio or television. They often hear a recording which they like enough to purchase, but don't know the name of the song, the artist performing it, or the record, tape, or CD album of which it is part. As a result, the number of recordings which people purchase is less than it otherwise would be if there was a simple way for people to identify which of the recordings that they hear on the radio or TV they wish to purchase.

Another area of interest to certain embodiments of the invention is copy control. There is currently a large market for audio software products, such as musical recordings. One of the problems in this market is the ease of copying such products without paying those who produce them. This problem is becoming particularly troublesome with the advent of recording techniques, such as digital audio tape (DAT), which make it possible for copies to be of very high quality. Thus it would be desirable to develop a scheme which would prevent the unauthorized copying of audio recordings, including the unauthorized copying of audio works broadcast over the airwaves. It is also desirable for copyright enforcement to be able to insert into program material such as audio or video signals digital copyright information identifying the copyright holder, which information may be detected by appropriate apparatus to identify the copyright owner of the program, while remaining imperceptible to the listener or viewer.

Various prior art methods of encoding additional information onto a source signal are known. For example, it is known to pulse-width modulate a signal to provide a common or encoded signal carrying at least two information portions or other useful portions. In U.S. Pat. No. 4,497,060 to Yang (1985) binary data is transmitted as a signal having two differing pulse-widths to represent logical "0" and "1" (e.g., the pulse-width durations for a "1" are twice the duration for a "0"). This correspondence also enables the determination of a clocking signal.

U.S. Pat. No. 4,937,807 to Weitz et al. (1990) discloses a method and apparatus for encoding signals for producing sound transmissions with digital information to enable addressing the stored representation of such signals. Specifically, the apparatus in Weitz et al. converts an analog signal for producing such sound transmissions to clocked digital signals comprising for each channel an audio data stream, a step-size stream and an emphasis stream.

With respect to systems in which audio signals produce audio transmissions, U.S. Pat. Nos. 4,876,617 to Best et al. (1989) and 5,113,437 to Best et al. (1992) disclose encoders for forming relatively thin and shallow (e.g., 150 Hz wide and 50 dB deep) notches in mid-range frequencies of an audio signal. The earlier of these patents discloses paired notch filters centered about the 2883 Hz and 3417 Hz frequencies; the later patent discloses notch filters but with randomly varying frequency pairs to discourage erasure or inhibit filtering of the information added to the notches. The encoders then add digital information in the form of signals in the lower frequency indicating a "0" and in the higher frequency a "1". In the later Best et al. patent an encoder samples the audio signal, delays the signal while calculating the signal level, and determines during the delay whether or not to add the data signal and, if so, at what signal level. The later Best et al. patent also notes that the "pseudo-random manner" in moving the notches makes the data signals more difficult to detect audibly.

Other prior art techniques employ the psychoacoustic model of the human perception characteristic to insert modulated or unmodulated tones into a host signal such that they will be masked by existing signal components and thus not perceived. See. e.g. Preuss et al., U.S. Pat. No. 5,319,735, and Jensen et al., U.S. Pat. No. 5,450,490. Such techniques are very expensive and complicated to implement, while suffering from a lack of robustness in the face of signal distortions imposed by perception-based compression schemes designed to eliminate masked signal components.

The prior art fails to provide a method and an apparatus for encoding and decoding auxiliary analog or digital information signals onto analog audio or video frequency signals for producing humanly perceived transmissions (i.e., sounds or images) such that the audio or video frequency signals produce substantially identical humanly perceived transmission prior to as well as after encoding with the auxiliary signals. The prior art also fails to provide relatively simple apparatus and methods for encoding and decoding audio or video frequency signals for producing humanly perceived audio transmissions with signals defining digital information. The prior art also fails to disclose a method and apparatus for limiting unauthorized copying of audio or video frequency signals for producing humanly perceived audio transmissions.

SUMMARY OF THE INVENTION

The present invention provides apparatus and methods for encoding, storing and decoding auxiliary information on an analog source signal in a way which has minimal impact on the perception of the source information when the source signal is applied to an appropriate output device, such as a speaker, a display monitor, or other electrical/electronic device.

The present invention further provides apparatus and methods for encoding, storing and decoding machine readable signals in an analog source signal which control the ability of a device to copy the source signal.

In particular, the present invention provides a method for encoding information symbols onto an analog host signal, comprising the steps of determining a short-term autocorrelation function value of the host signal; determining a value of an auxiliary information signal containing an information symbol; calculating a value of the short-term auto-correlation function of the host signal corresponding to the determined value of the auxiliary information signal according to a predefined relationship between auxiliary information signal value and host signal autocorrelation value; developing a host modifying signal for modifying the host signal such that the short-term autocorrelation function value of the modified host signal will correspond to said calculated value; and modifying the host signal with said host modifying signal.

According to another embodiment of the invention, a method is provided for decoding information symbols encoded onto an analog host signal, comprising the steps of: calculating a short-term autocorrelation function of the encoded host signal; determining the value of the generated autocorrelation function; and determining a value of an information symbol as a function of the value of the generated autocorrelation function and a predefined relationship between information symbol values and autocorrelation function values.

The present invention further provides apparatus for encoding information in accordance with the above method, and apparatus for decoding the encoded information on the host signal.

BRIEF DESCRIPTION OF THE DRAWINGS

These and other aspects of the present invention will become more fully understood from the following detailed description of the preferred embodiments in conjunction with the accompanying drawings, in which:

FIG. 8 is a block diagram of decoder 20 of FIG. 1 according to an alternate embodiment of the present invention.

DETAILED DESCRIPTION OF THE PREFERRED EMBODIMENTS

The present invention is directed to a method and apparatus for encoding auxiliary information onto a host or source signal, such as an audio signal, video signal, or other data signal, by modulating or changing the short-term autocorrelation function of the host signal as a function of the auxiliary information over time, at one or more selected autocorrelation delays. The auxiliary information may be an analog or digital signal. The short-term autocorrelation function is obtained by multiplying a signal with a delayed version of itself, and integrating the product over a predefined integration interval.

The short-term autocorrelation function is modulated or changed by adding to the host signal a host modifying signal having a positive or negative correlation with the original host signal. The embedded signal is preferably a controllably attenuated version of the host signal which has been delayed or advanced (for purposes of the invention, an advance will be considered a negative delay) in accordance with the selected autocorrelation delay.

The autocorrelation function can be modulated using the entire host signal or only a portion of it. In the preferred embodiment, frequency bands, temporal and/or spatial regions of the host signal are chosen so as to minimize the disturbance to the host signal as it affects the perception of the signal's output (i.e., audio or video quality).

According to another aspect of the invention, multiple host modifying signal components can be added to the host signal in the same or different frequency bands and temporal and/or spatial regions by generating host modifying signal components with different autocorrelation delays. The multiple host modifying signal components can represent different auxiliary information to increase overall auxiliary information throughput, or can represent the same auxiliary information to increase the robustness or security of the auxiliary information signal transmission.

Security is enhanced by maintaining confidential the information concerning specific parameters of the host modifying signal, which would be known only to the encoder and decoder of the system. The host modifying signal components may also have autocorrelation delays which vary over time according to a predetermined sequence or pattern, referred to herein as a "delay hopping pattern."

Figure 1:
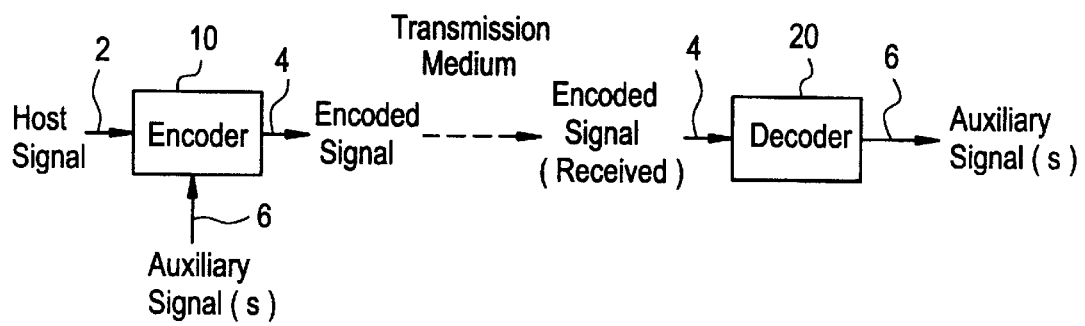
FIG. 1 is a block diagram of an auxiliary information signal encoding and decoding process according to one embodiment of the present invention.

Referring now to the drawings, FIG. 1 shows a block diagram of the overall system according to one embodiment of the invention. The system comprises an encoder 10 for encoding a host signal 2 (such as an audio or video program or source signal) with an auxiliary information signal 6, to produce an encoded signal 4. The encoded signal 4 may be transmitted over a communication medium, channel or line, or may be stored on a storage medium such as magnetic tape, optical memory, solid state memory, or electromagnetic memory, and also may be further processed such as by filtering, adaptive gain control, or other signal processing techniques, without impairing or degrading the encoded auxiliary information. The encoded signal 4 is then decoded in a decoder 20 to retrieve the auxiliary information signal 6.

Figure 2:
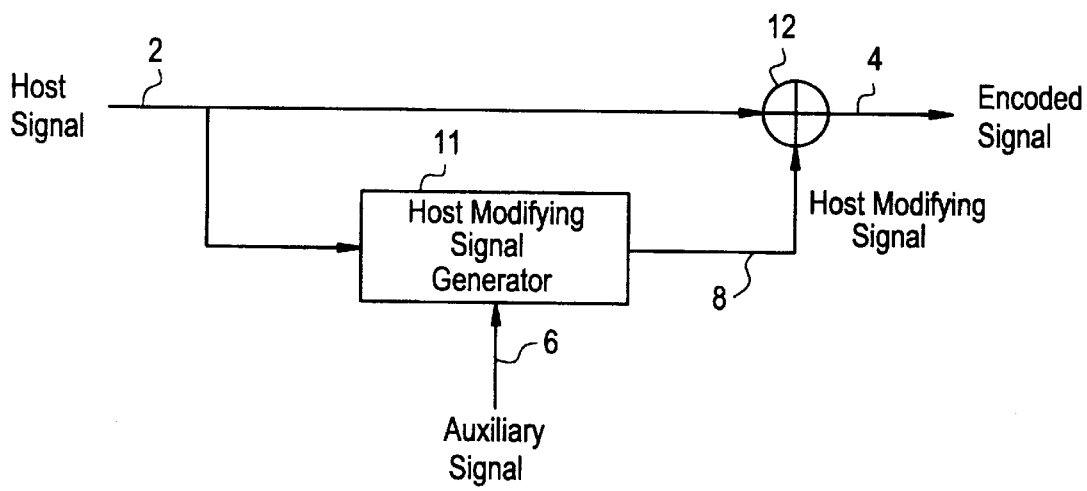
FIG. 2 is a block diagram of one embodiment of the encoder 10 of FIG. 1.

FIG. 2 shows a detail of the encoder 10 according to a preferred embodiment in which the host signal is modified by a single host modifying signal 8, produced by a host modifying signal generator 11 which receives the host signal 2 and the auxiliary information signal 6. The host modifying signal is added to the host signal in an adder 14 to provide the encoded signal 4.

Figure 3:
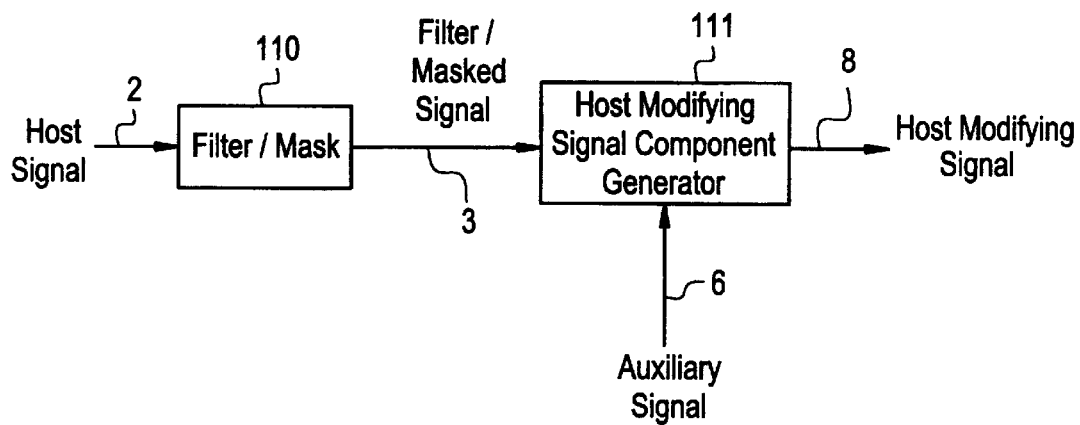
FIG. 3 is a block diagram of one embodiment of the host modifying signal generator 11 of FIG. 2.
Figure 4:
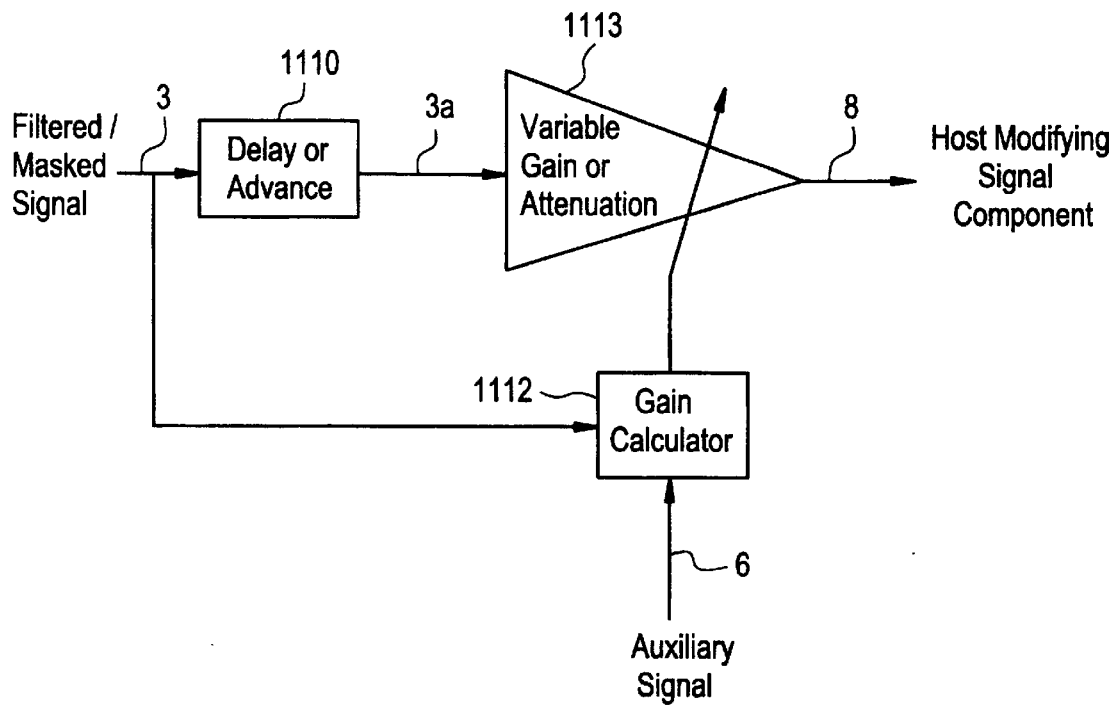
FIG. 4 is a block diagram of one embodiment of the host modifying signal component generator 111 of FIG. 3.

The host modifying signal is obtained as shown in FIG. 3, which illustrates one embodiment of the host modifying signal generator 11. In this embodiment, the host signal 2 is filtered and/or masked by a filter/mask 110. The filter/mask 110 modifies the frequency, period, or spatial content of the host signal in such manner to cause minimal disturbance to the output characteristics of the host signal when applied to an output device such as a speaker or a video monitor. It is also possible for the filter/mask to pass the host signal unchanged, in which case the filtered/masked signal 3 would be equal to the host signal 2. The signal 3 is then inputted to a host modifying signal component generator 111, wherein it is modified according to an input auxiliary information signal 6, to produce a host modifying signal 8. The details of the host modifying signal component generator 111 are shown in FIG. 4.

As shown, the filtered host signal 3 is inputted to a delay/advance circuit 1110 to produce a delayed/advanced signal 3a. The signal 3 is also inputted to a gain calculator 1112 along with auxiliary information signal 6. The purpose of the gain calculator 1112 is to calculate the gain of variable gain or attenuation circuit 1113 which is to be applied to delayed signal 3a in order to obtain the host modifying signal 8. The amount of delay (or advancement) applied by delay/advance circuit 1110 corresponds to the autocorrelation delay at which the host signal is being modulated.

The amount of gain applied to the signal 3a at any time or spatial region is determined by the gain calculator 1112 as a function of the values of the auxiliary information signal 6 and the filtered signal 3. The short-term autocorrelation of the filtered signal 3 can be expressed by the formula $$R(t, \tau) = \int_{t-T}^{t} s(x)s(x-\tau)dx \quad (1)$$

where s(t) is the filtered signal 3, R(t,τ) is the short-term autocorrelation of s(t), τ is the delay at which the autocorrelation is evaluated, T is the integration interval, and t is time.

By adding a host modifying signal e(t) to the filtered signal s(t), the autocorrelation function R(t,τ) is modulated to obtain a modulated autocorrelation function $R_m(t,\tau)$:

$$R_m(t, \tau) = \int_{t-T}^{t} (s(x)+e(x))(s(x-\tau)+e(x-\tau))dx \quad (2)$$

$$= R(t, \tau) + \int_{t-T}^{t} (s(x)+e(x-\tau)+e(x)(s(x-\tau)+e(x)e(x-\tau))dx$$

By appropriately selecting the host modifying signal e(t), an increase or decrease of the short-term autocorrelation function can be achieved. It will be apparent that many different types of host modifying signals may be used to achieve this modulation. In the preferred embodiment, delayed or advanced versions of the host signal multiplied by a selected amount of gain or attenuation are used as the host modifying signal e(t). Specifically, $$e(t)=gs(t-\tau) \quad (3a)$$

or $$e(t)=gs(t+\tau) \quad (3b)$$

Substituting equations (3a) and (3b) respectively into equation (2), it is seen that the short-term autocorrelation of the resulting modified signal can be written as $$R_m(t,\tau)=R(t,\tau)+gR(t,2\tau)+gR(t-\tau,0)+g^2R(t-\tau,\tau) \quad (4a)$$

or $$R_m(t,\tau)=R(t,\tau)+gR(t,0)+gR(t+\tau,2\tau)+g^2R(t+\tau,\tau) \quad (4b)$$

The autocorrelation functions R(t,τ) of the host signal which appear on the right hand side of equations (4a) and (4b) can be measured, and their values used to obtain the solution for gain g that will produce a desired value for the modulated autocorrelation function $R_m(t,\tau)$. It is typically desired to have small values for g so as to keep the host modifying signal transparent to the perceiver of the host signal. If this is the case, the $g^2$ terms in equations (4a) and (4b) can be ignored as negligible, such that the exact gain value can be closely approximated by $$g \approx \frac{R_m(t, \tau) - R(t, \tau)}{R(t, 2\tau) + R(t-\tau, 0)} \quad (5a)$$

or $$g \approx \frac{R_m(t, \tau) - R(t, \tau)}{R(t, 0) + R(t+\tau, 2\tau)} \quad (5b)$$

respectively. While the present invention is equally applicable to the encoding of analog auxiliary information signals, the following discussion assumes the auxiliary information signal is a digital signal having values taken from an M-ary set of symbols $d_i \in \{\pm 1, \pm 3, \ldots \pm(2M-1)\}$, for i=1, 2, 3, ... which are transmitted at times $t=iT_s$, where $T_s$ denotes the symbol interval or period. According to the first preferred embodiment of the invention, each auxiliary information symbol is associated with a corresponding value of the short-term autocorrelation function. One way to map the symbols onto the autocorrelation function value domain while keeping the host modifying signal small with respect to the host signal, is to employ the formula $$R_m(iT_s,\tau)=\zeta d_i R_m(iT_s,0) \quad (6)$$

where ζ is a small quantity selected to balance the requirement of signal robustness with the requirement that the host modifying signal be transparent to the perceiver. By inserting equations (4a) and (4b) respectively into equation (6), a quadratic equation for g is obtained, the solution of which provides the appropriate gain $g_i$ for the symbol transmitted at time $t=iT_s$. Alternatively, approximate values for $g_i$ can be obtained using formulas (5a) or (5b). The gain is held constant over the symbol interval in order to minimize any errors. Further deviation of $g_i$ from its desired value can be used at the boundaries of the symbol interval to avoid abrupt changes in the host modifying signal which might jeopardize the requirement for host modifying signal transparency. Modulation error caused by such smoothing does not significantly degrade the performance of the encoding system. The integration interval T should be shorter than $T_s-\tau$ in order to minimize intersymbol interference. However, certain overlap between adjacent symbols can be tolerated in order to increase the auxiliary channel bandwidth.

In an alternative embodiment of the invention, the gain calculator 1112 may map a fixed gain to be applied to the filtered/masked and delayed/advanced signal 3a according to only the value of the auxiliary information signal 6. According to this embodiment, the gain calculator ignores the value of the signal 3, and as such the input line for signal 3 may be omitted. In this embodiment, the gain calculator will apply a fixed amount of gain depending on the value of the auxiliary signal 6. For example, in the instance where the auxiliary signal is a binary signal, the gain calculator could apply a predetermined positive gain for an auxiliary signal of "0" and a predetermined negative gain for an auxiliary signal of "1". This approach will enable the encoder to have reduced complexity; however, it requires a larger modifying signal to obtain the same performance characteristics in terms of bit-error rate or signal robustness.

Figure 6:
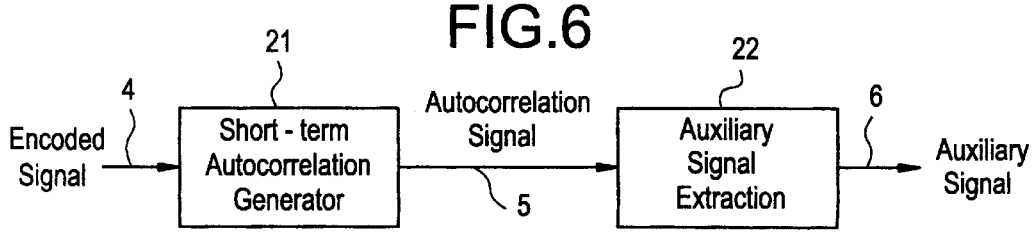
FIG. 6 is a block diagram of one embodiment of decoder 20 of FIG. 1.
Figure 7:
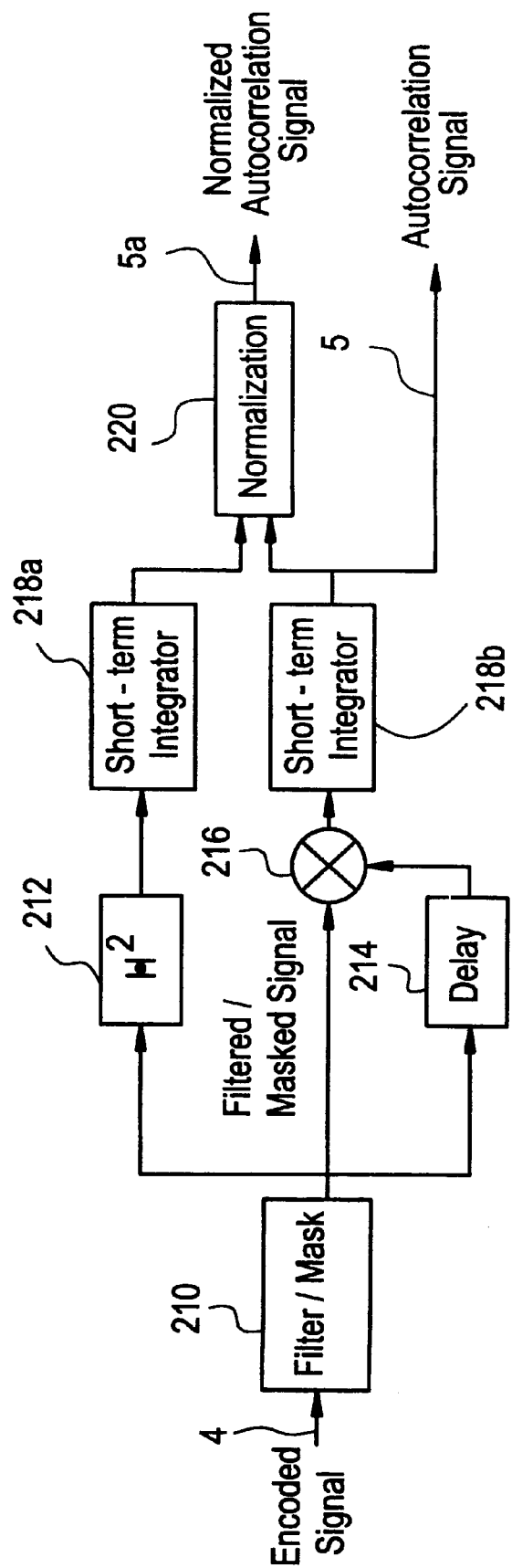
FIG. 7 is a block diagram of short-term autocorrelation generator 21 according to one embodiment of the present invention.

In order to recover the auxiliary information signal 6 from the encoded signal 4, the encoded signal is applied to a decoder 20. Details of the decoder 20 according to one embodiment are shown in FIG. 6. According to this embodiment, the decoder consists of a short-term autocorrelation generator 21 and an auxiliary signal extraction circuit 22. As shown in FIG. 7, the short-term autocorrelation generator 21 includes a filter/mask 210 which filters and/or masks the encoded signal 4, and then obtains an autocorrelation signal by applying the filtered encoded signal to a squaring circuit 212, a delay circuit 214, and a multiplier 216. The output of the squaring circuit 212 and the output of the multiplier 216 are applied to short-term integrators 218a and 218b. The output of integrator 218b is an autocorrelation signal 5. The outputs of integrators 218a and 218b are also applied to a normalization circuit 220, to produce a normalized autocorrelation signal 5a. The filter/mask 210 can have the same characteristics as the filter/mask 110 of the encoder (or may be different), and in some circumstances may be omitted entirely. The delay circuit 214 uses the same delay $\tau$ as used in the delay/advance circuit 1110 of the encoder. The squaring circuit 212 calculates the square of the filtered encoded signal, which is the same as calculating the short-term autocorrelation with a delay of zero and integrating over interval T. The normalization circuit 220 outputs a normalized autocorrelation signal d(t), which is equal to:

$$d(t) = \frac{R_m(t, \tau)}{R_m(t, 0)} \quad (7)$$

In the special case where the auxiliary signal is in the form of binary data, the information symbols can be recovered by determining the sign (+ or −) of $R_m(t,\tau)$ at the individual sampled symbol intervals, and thus it would be unnecessary to calculate the zero delay autocorrelation and the normalized autocorrelation signal.

The auxiliary information signal is obtained from the normalized autocorrelation signal by the auxiliary signal extraction circuit 22. In the absence of signal distortion, d(t) has values at discrete points in time separated by $T_s$ that are directly proportional to the magnitude of the input symbols. Signal extraction may be performed by one or more well known techniques in the art of digital communications, such as filtering, masking, equalization, synchronization, sampling, threshold comparison, and error control coding functions. Such techniques being well known, they will not be further elaborated upon.

According to a second embodiment of the invention, each auxiliary data symbol may be associated with a set of short-term autocorrelation values, the particular set being chosen so as to minimize the value of g based upon the value of the auxiliary data symbol. As an example, for a binary-valued auxiliary signal, the bit transmitted at time $iT_s$ is associated with the set of autocorrelation values $2j\zeta R_m(iT_s, 0)$ for j=0, ±1, ±2, . . . etc. if it is a "1", or the set $(2j-1)\zeta R_m(iT_s,0)$ for j=0, ±1, ±2, . . . etc. if it is a "0". The value of j for each bit is selected to minimize the magnitude of g obtained through solution of equations (4a) or (4b). Alternatively, approximate calculation can be performed by using equations (5a) or (5b) if j is chosen so that the value is nearest to R(t,τ). In this embodiment, the decoder operates in the same way as in the first embodiment, except that multiple autocorrelation values are mapped to the same auxiliary information symbol.

According to a third embodiment of the invention, the auxiliary information symbols are encoded as a difference in short-term autocorrelation functions at predefined time instances. For example, the symbol interval is divided into two equal parts and the autocorrelation function is determined for each part. The difference between the two autocorrelation functions is then changed so as to represent the auxiliary data. If the data symbol at $iT_s$ is $d_i \in \{\pm 1, \pm 3, \ldots \pm(2M-1)\}$, for i=1, 2, 3 , . . ., then the desired difference can be expressed by $$R_m(iT_s,\tau) - R_m((i+0.5)T_s,\tau) = \zeta d_i R_m(iT_s,0) \quad (8)$$

where $\zeta$ is a small quantity determined to balance the robustness/transparency requirements. Substituting equations (4a) or (4b) into equation (8) produces a quadratic equation for g which can be solved to obtain the value of g which is applied to the host modifying signal in the first half of the symbol interval. Gain equal in magnitude but opposite in sign (polarity) is applied to the host modifying signal in the second half of the symbol interval. To minimize intersymbol interference the integration interval should be shorter than $(T_s/2)-\tau$. A small amount of interference may be tolerated to obtain an increase in bit rate.

Figure 5:
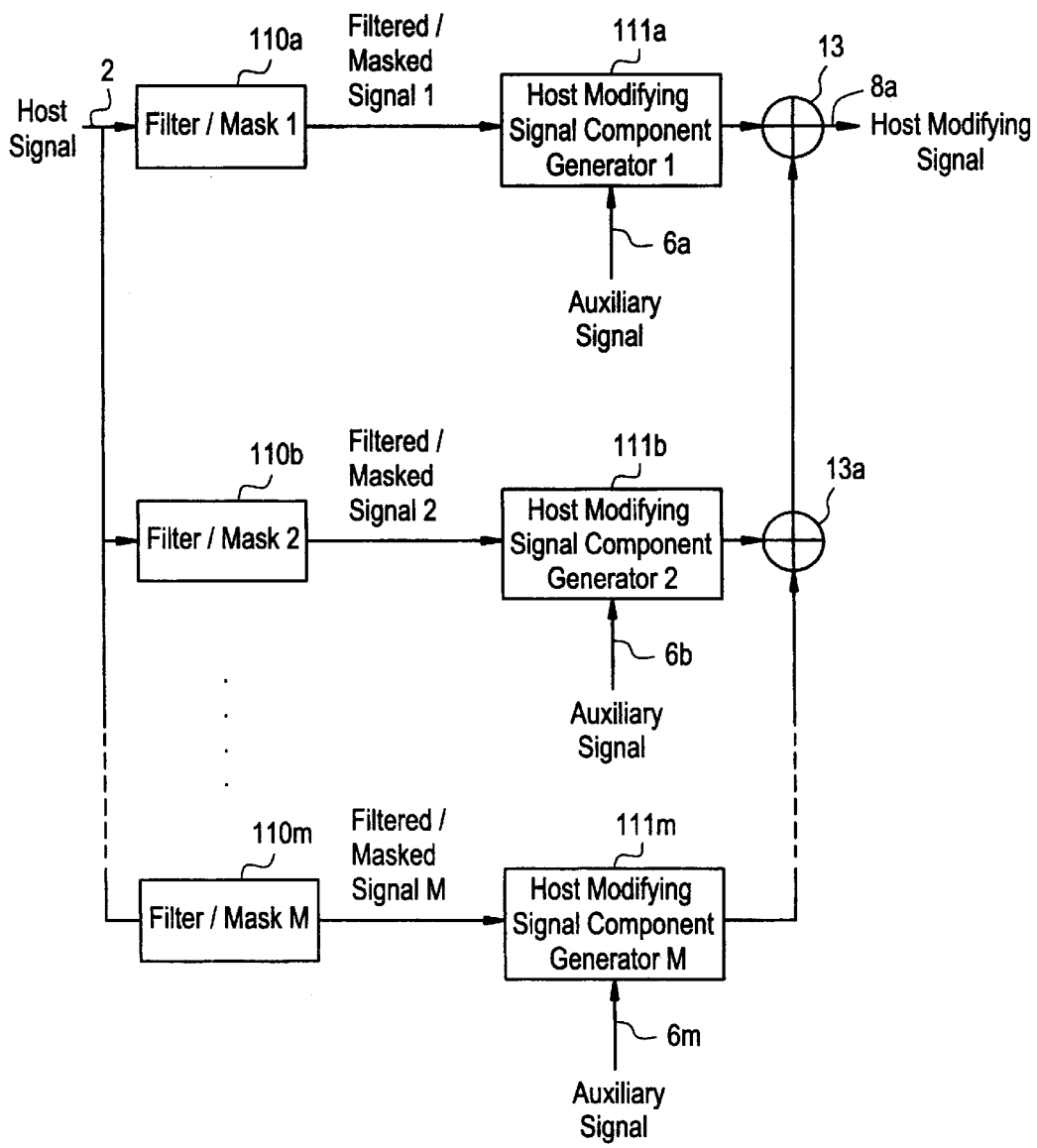
FIG. 5 is a block diagram of a host modifying signal generator according to an alternate embodiment of the present invention.

According to another embodiment of the invention, the host modifying signal is composed of a sum of multiple auxiliary information signal components, obtained according to the encoder shown in FIG. 5. Here, a plurality of filter/mask 110a–110m provide a plurality of host signals to a plurality of host modifying component generators 111a–111m, which are added together in adders 13, 13a, etc. to produce a host modifying signal 8a. In this embodiment, M auxiliary signal components are generated by using differing amounts of delay in each of the component generators. The auxiliary signals 6a–6m can each be different, or may be the same in order to increase robustness and security level. A restriction is that for any two component generators having equal amounts of delay, and appearing in the same or overlapping frequency bands, time intervals or spatial masks, the auxiliary signals must be the same. In this instance the preferred host modifying signals take the form:

$$e(t) = \Sigma g_m s(t - \tau_m) \quad (9)$$

where $\tau_m$ and $g_m$ represent the delay and gain for the mth host modifying symbol component. By substituting equation (9) into equation (2), the following is obtained:

$$R_m(t, \tau) = R(t, \tau) + \sum_{m=1}^{M} g_m(R(t, \tau_m + \tau) + R(t - \tau, \tau_m - \tau)) + \sum_{m1=1}^{M} \sum_{m2=1}^{M} g_{m1} g_{m2} R(t - \tau_{m1}, \tau + \tau_{m2} - \tau_{m1}) \quad (10)$$

For a random signal s(t), and sufficiently large τ, R(t,τ) is much smaller than R(t,0). Therefore the set of delays $\{\tau_m\}$ should be chosen such that $R_m(t,\tau)$ calculated for $\tau = \pm \tau_m$ according to equation (10) has only one term for which the short-term autocorrelation delay is equal to zero. This term will have dominant effect on the modulation of the $R_m(t,\tau_m)$. As different Tm are chosen, different terms in equation (10) become dominant in the summation, effectively "tuning" different host modifying components.

The decoder associated with this embodiment is shown in FIG. 8. The decoder includes a number of short-term autocorrelation generators 21a–21n, one for each delay amount for which a host modifying signal component was generated. The generated autocorrelation signals are processed together by auxiliary signal extraction circuit 22 and are either combined to obtain the auxiliary signal or independently processed to extract a multiplicity of auxiliary information signals.

According to a fifth embodiment of the invention, the host modifying signal components may change their corresponding autocorrelation delay amounts τ over time according to a predefined delay pattern referred to as "delay hopping." The security of the auxiliary signal is enhanced by maintaining the delay hopping pattern secret. The hopping pattern can be defined as a list of consecutive autocorrelation delays and their duration. An authorized decoder needs to know the hopping pattern as well as the filtering/masking parameters and signaling parameters (symbol duration and other symbol features). Multiple auxiliary signals can be carried simultaneously in the host signal if their hopping patterns are distinct, even if other filtering/masking and signalling parameters are the same.

The invention having been thus described, it will be apparent to those skilled in the art that the same may be varied in many ways without departing from the spirit and scope of the invention. For example, in the above description of the preferred embodiments of the invention, reference has been made to the perception of the host signal by a "perceiver." In the context of the invention, a perceiver may be a device such as a computer, radar detector, or other electrical/electronic device in the case of host signal being communication signals, as well as a human in the case of audio or video host signals. Further, the implementation of the invention can be carried out using analog circuitry as well as digital circuitry such as ASICs (Application Specific Integrated Circuits), general purpose digital signal processors, microprocessors and equivalent apparatus. Further, it is possible for the characteristics of the filter/mask to change over time according to a predefined pattern which may have characteristic changes of varying duration. Finally, it is noted that a function similar to that of the present invention may be obtained under some circumstances using transform-domain processing techniques (such as Fourier or cepstral domain) which may be implemented using known algorithms such as the Fast Fourier Transform or FFT.

Any and all such modifications are intended to be included within the scope of the following claims.

What is claimed is:

1. A method for encoding information symbols onto an analog host signal, comprising the steps of:
   determining a short-term autocorrelation function value of said host signal;
   determining a value of an auxiliary information signal containing an information symbol;
   calculating a value of the short-term autocorrelation function of said host signal corresponding to said determined value of said auxiliary information signal according to a predefined relationship between auxiliary information signal value and host signal autocorrelation value;
   developing a host modifying signal for modifying said host signal such that the short-term autocorrelation function value of the modified host signal will correspond to said calculated value; and
   modifying said host signal with said host modifying signal.

2. A method for encoding information symbols onto an analog host signal according to claim 1, wherein said host modifying signal is developed from said host signal.

3. A method for encoding information symbols onto an analog host signal according to claim 1, wherein the step of modifying said host signal comprises the step of adding said host modifying signal to said host signal.

4. A method for encoding information symbols onto an analog host signal according to claim 2, wherein the step of developing comprises varying the gain of said host signal as a function of said predefined relationship and the values of said host signal and said auxiliary information signal.

5. A method for encoding information symbols onto an analog host signal according to claim 2, further comprising the step of modifying a parameter of said host signal to produce a filtered host signal for use in developing said host modifying signal.

6. A method for encoding information symbols onto an analog host signal according to claim 5, wherein said parameter comprises the frequency content of said host signal.

7. A method for encoding information symbols onto an analog host signal according to claim 5, wherein said parameter comprises the spatial content of said host signal.

8. A method for encoding information symbols onto an analog host signal according to claim 5, wherein said parameter comprises a temporal region of said host signal.

9. A method for encoding information symbols onto an analog host signal according to claim 5, wherein said parameter comprises a sampling rate of said host signal.

10. A method for encoding information symbols onto an analog host signal according to claim 1, wherein said analog host signal is an audio signal.

11. A method for encoding information symbols onto an analog host signal according to claim 1, wherein said analog host signal is a video signal.

12. A method for encoding information symbols onto an analog host signal according to claim 1, wherein said predefined relationship between said short-term autocorrelation function value and said auxiliary information symbol values varies as a function of predetermined values of auxiliary information symbols.

13. A method for encoding information symbols onto an analog host signal according to claim 4, wherein the step of varying the gain comprises the step of varying the gain of said host signal by a predetermined magnitude with a first polarity in a first half of an information symbol interval, and varying the gain of said host signal in a second half of said information symbol interval by said predetermined magnitude with a second polarity opposite said first polarity.

14. A method for encoding information symbols onto an analog host signal according to claim 1, wherein said host modifying signal is comprised of a sum of a plurality of modifying signal components, each having a different amount of delay with respect to said host signal.

15. A method for encoding information symbols onto an analog host signal according to claim 2, wherein said host modifying signal is delayed by a predetermined delay $\tau$ with respect to said host signal.

16. A method for encoding information symbols onto an analog host signal according to claim 15, wherein said predetermined delay $\tau$ varies as a function of time according to a predetermined delay pattern.

17. A method for decoding information symbols encoded onto an analog host signal, comprising the steps of:
   calculating a short-term autocorrelation function of said encoded host signal;
   determining the value of said calculated autocorrelation function; and
   determining a value of an information symbol as a function of the value of said calculated autocorrelation function and a predefined relationship between information symbol values and autocorrelation function values.

18. A method for decoding information symbols encoded onto an analog host signal according to claim 17, wherein the step of calculating a short-term autocorrelation function of said encoded host signal uses a delay $\tau$, and wherein the step of determining a value of an information symbol comprises the steps of:

calculating a short-term autocorrelation function with zero delay; and calculating a normalized autocorrelation signal by dividing said autocorrelation function with delay $\tau$ by said autocorrelation function with zero delay.

19. A method for decoding information symbols encoded onto an analog host signal according to claim 18, wherein said encoded host signal is comprised of a sum of a plurality of modifying signal components, each having a different amount of delay with respect to said host signal, and said step of determining a value of an information symbol comprises performing the steps of determining values for each of said plurality of modifying signal components.

20. A method for decoding information symbols encoded onto an analog host signal according to claim 18, wherein said predetermined delay $\tau$ varies as a function of time according to a predetermined delay pattern.

21. Apparatus for encoding information symbols onto an analog host signal, comprising:

means for determining a short-term autocorrelation function value of said host signal;

means for determining a value of an auxiliary information signal containing an information symbol;

means for calculating a value of the short-term autocorrelation function of said host signal corresponding to said determined value of said auxiliary information signal according to a predefined relationship between auxiliary information signal value and host signal autocorrelation value;

means for developing a host modifying signal for modifying said host signal such that the short-term autocorrelation function value of the modified host signal will correspond to said calculated value; and means for modifying said host signal with said host modifying signal.

22. Apparatus for decoding information symbols encoded onto an analog host signal, comprising:

means for calculating a short-term autocorrelation function of said encoded host signal;

means for determining the value of said calculated autocorrelation function; and means for determining a value of an information symbol as a function of the value of said calculated autocorrelation function and a predefined relationship between information symbol values and autocorrelation function values.

23. A method for encoding information symbols onto an analog host signal, comprising the steps of:

determining a short-term autocorrelation function value of said analog host signal;

determining a value of an auxiliary information signal containing an information symbol;

developing a host modifying signal for modifying said host signal such that the short-term autocorrelation function value of the modified host signal will correspond to said determined value; and modifying said host signal with said host modifying signal.

24. A method for encoding information symbols onto an analog host signal according to claim 23, wherein said host modifying signal is developed from said host signal.

25. A method for encoding information symbols onto an analog host signal according to claim 23, wherein the step of modifying said host signal comprises the step of adding said host modifying signal to said host signal.

26. A method for encoding information symbols onto an analog host signal according to claim 24, wherein the step of developing comprises varying the gain of said host signal as a function of a predefined relationship between gain and said auxiliary information signal.

27. A method for decoding information symbols encoded onto an analog host signal, comprising the steps of:

calculating a short-term autocorrelation function of said encoded host signal; and determining a value of an information symbol as a function of the value of said calculated autocorrelation function and a predefined relationship between information symbol values and autocorrelation function values.

* * * * *